_US005607984A_

United States Patent [19]
Duocastella-Codina et al.

[11] Patent Number: 5,607,984
[45] Date of Patent: Mar. 4, 1997

[54] FLEXIBLE POLYURETHANE FOAMS WITH REDUCED FOGGING EFFECT AND POLYESTERS SUITABLE FOR THEIR PREPARATION

[75] Inventors: Luis Duocastella-Codina, Santa Coloma de Cervello; Jose M. Monso-Capelllades; Jose Soler-Llado, both of Barcelona, all of Spain

[73] Assignee: Hoocker, S.A., Barcelona, Spain

[21] Appl. No.: 259,757

[22] Filed: Jun. 13, 1994

[30] Foreign Application Priority Data

Jun. 11, 1993 [ES] Spain .................................. P9301288

[51] Int. Cl.$^6$ .................................................. C08G 18/14
[52] U.S. Cl. ...................... 521/172; 428/423.1; 521/173; 528/80; 528/83; 528/84; 528/272; 568/852; 568/864
[58] Field of Search ...................................... 521/172, 173; 528/80, 83, 84, 272; 568/852, 864; 428/423.1

[56] References Cited

U.S. PATENT DOCUMENTS 3,391,093  7/1968  Frost et al. .
5,286,761  2/1994  Naujoks et al. ........................ 521/172

FOREIGN PATENT DOCUMENTS

4223014-A  3/1994  Germany .
59100152   9/1993  Japan .

OTHER PUBLICATIONS

Diblitz, et al, "Incorporable Amine Catalysts for Flexible Foams Without Fogging", Utech '90 Proceedings, Dec. 1990), pp. 80–85.
Blundell, et al, "The Fogging Performance of Flame Retardents in Flexible Polyurethane Foam", Utech '90 Proceedings, pp. 76–79, Dec. 1990.

*Primary Examiner*—James J. Seidleck
*Assistant Examiner*—John M. Cooney, Jr.
*Attorney, Agent, or Firm*—Michael J. Striker

[57] ABSTRACT

New flexible polyurethane foams are described, suitable for use in the interior linings of cars, with a reduced fogging effect, whose content by weight of the cyclic adipate of diethylene glycol, 8,13-dioxo-1,4,7-trioxacyclotridecane, is less than 0.25% and preferably less than 0.17%. Also described are polyester polyols, suitable for preparing these polyurethane foams, whose content by weight of the cyclic adipate of diethylene glycol, 8,13-dioxo-1,4,7-trioxacyclotridecane, is less than 0.4% and preferably less than 0.25%.

4 Claims, No Drawings

N5,607,984

FLEXIBLE POLYURETHANE FOAMS WITH REDUCED FOGGING EFFECT AND POLYESTERS SUITABLE FOR THEIR PREPARATION

BACKGROUND OF THE INVENTION

The present invention relates to flexible polyurethane foams, suitable for use in the automobile industry, which have a considerably reduced fogging effect because they are manufactured using polyester polyols in which the proportion of volatile residues has been reduced or in which the volatile residues have been eliminated.

In the industry of manufacturing polymeric materials for the automobile industry there is a growing preoccupation with the fogging of the front and rear windshields and side windows of cars because of volatile residue condensation that accompanies these polymeric materials. This problem, which is known in the industrial sector as the fogging effect, as well as the unpleasant characteristic odor produced by the evaporation of the volatile residues and its possible toxic consequences, is produced by conditions in which the interior of the vehicle is subjected to relatively high temperatures, for example when closed vehicles are exposed to the sun, causing the volatile substances to evaporate and condense on the colder surfaces of the windows.

As a result, the automobile industry imposes increasingly stricter requirements on the suppliers of the polymeric materials, so that the polymeric materials used in the interiors of automobiles must currently have a fogging effect less than 1 mg in the gravimetric test according to Standard DIN 75201 B.

Recent publications have disclosed the influence of some additives on the fogging effect produced by flexible polyurethane foams made of polyether polyols. C. Blundell, and J. Wuestenenk, Utech'90 Proceedings, 76–79 (1990) have shown the influence of flame retarding agents, and K. Diblitz and D. Hoell, Utech'90 Proceedings, 80–85 (1990) have done the same with amine-type catalysts.

If they are well formulated, flexible polyurethane foams made using polyether polyols exhibit fogging values that are lower than those made using polyester polyols. However, foams made using polyester polyols provide advantages including better mechanical properties, a better cellular structure, greater resistance to oils and oxidation, and furthermore are easier to flame roll, have a lower total emission of gases and are easier to recycle. Therefore, the need remains to solve the problem of providing the automobile industry with flexible polyurethane foams made using polyester polyols that, without losing their excellent properties, have reduced levels of fogging that fulfill the strict requirements currently imposed by the industry.

SUMMARY OF THE INVENTION

The present invention solves the above-described problem as a result of the finding that, in flexible polyurethane foams made using polyester polyols, the fogging effect problem is to a large extent related to the presence of a certain by-product, originating from the synthesis of the polyesters, and that the reduction in the content or the elimination of that by-product makes it possible to produce polyurethane foams which, without suffering any loss in terms of their properties, exhibit a level of fogging which is so low that they easily fulfill the requirements of the automobile manufacturers.

It is an object of the present invention to provide flexible polyurethane foams made using polyester polyols with a reduced content of volatile by-products that, without suffering any loss in terms of their properties, exhibit fogging values so low that they easily fulfill the requirements set by the automobile manufacturers.

It is another object of the invention to provide polyester polyols, with a reduced content of volatile by-products, which can be used for preparing flexible polyurethane foams which, without suffering any loss in terms of their properties, exhibit fogging values so low that they easily fulfill the requirements set by the car manufacturers.

DETAILED DESCRIPTION OF THE INVENTION

The flexible polyurethane foams that are the object of the present invention, which are prepared by reacting polyisocyanates with polyester polyols, contain less than 0.25% by weight of the cyclic adipate of diethylene glycol, hereinafter referred to as cyclic ester, 8,13-dioxo-1,4,7-trioxacyclotridecane of structural formula I:

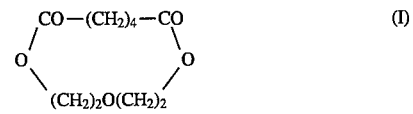

It has been found that during the preparation of the adipic acid—diethylene glycol polyester, one of the polyester polyols most widely used in the preparation of flexible polyurethane foams, a certain proportion of the cyclic ester of formula (I) is formed. It has also been found that the cyclic ester content of the widely used conventional polyester polyols is about 1% to 1.5% by weight, and that, as a result, the cyclic ester content of the polyurethane foams made using them is clearly greater than 0.6%.

It has also been found that this cyclic ester is to a large extent the cause of the fogging effect in flexible polyurethane foams made using polyester polyols, and that by reducing or eliminating it from the polyester, before the polyurethane is formed, fogging values in the final product are, i.e. the fogging effect is, considerably reduced.

This is a new and surprising result, since until now it was thought that the major factor giving rise to the fogging effect in polyurethane foams was mainly the different additives used in their manufacture.

In order to eliminate or reduce the cyclic ester content of the polyester polyols any known method for eliminating impurities can be used, although it has been observed that it is particularly suitable to use a method based on the distillation of the cyclic ester, together with other volatile impurities, by a thin film technique at a pressure of less than 10 mm Hg, preferably less than 1 mm Hg, and at temperatures greater than 100° C., in which the liquid mass remains inside the evaporator for a period of less than five minutes, preferably less than one minute.

The polyester polyol is prepared by conventional techniques, known to an expert in the field, by reacting adipic acid with diethylene glycol and other polyalcohols under suitable conditions.

The product obtained by the reaction is purified by distillation, in the manner described above, to obtain a polyester with a cyclic ester content of less than 0.4% by weight, preferably less than 0.25% by weight.

Using the polyester obtained thereby, conventional methods known to one skilled in the chemical arts can be used to prepare flexible polyurethane foams with a cyclic ester content of less than 0.25% by weight, preferably less than 0.17% by weight, which can achieve values of less than 1 mg in the test according to Standard DIN 75201 B and which, as a result, easily fulfill the requirements set by the car manufacturers.

Furthermore, the flexible polyurethane foams obtained do not exhibit any loss in terms of their properties and are perfectly suitable for use in the interior linings of cars.

Comparative tests carried out show that a polyurethane foam prepared using a polyester of a polyol in which the amount of cyclic ester is reduced to 0.25% by weight, exhibits a value of less than 1 mg in the test according to Standard DIN 75201 B, while a foam obtained using the same polyester, before reducing the cyclic ester content, with a cyclic ester content about 1% to 1.5% by weight, exhibits values greater than 6 mg in the test according to said DIN standard under the same conditions. Furthermore, if the corresponding proportion of cyclic ester is added to the polyester with a reduced cyclic ester content, so as to recover the initial value, the polyurethane foam obtained once again produces high fogging values in the test according to Standard DIN 75201 B.

It has also been found that the reduced fogging values obtained in the test according to Standard 75201 B with polyurethane foams prepared using polyester polyols with a low cyclic ester content, according to the present invention, are not substantially affected by other factors such as the temperature or duration of the test, the thickness or the presence of amine type catalysts such as N-ethyl morpholine or dimethyl benzylamine.

In order that the present invention be better understood, there follow a number of non-limiting examples.

EXAMPLES

Example 1

A polyester polyol is prepared by a conventional technique using the following essential reagents:

| | |
|---|---|
| Adipic acid | 55.43 parts by weight |
| Diethylene glycol | 41.52 parts by weight |
| Trimethylol propane | 3.05 parts by weight |

The polyester polyol thus obtained is separated into two portions, A and B. Portion B is subjected to a process of distillation in a continuous film distiller in a vacuum under the following conditions:

| | |
|---|---|
| Temperature entering the distiller | 125° C. |
| Heating circuit temperature | 250° C. |
| Feed rate | 500 l/h |
| Vacuum | <1 mm Hg |
| Time inside the distiller | 1 minute |

Portion A is subjected to conventional distillation to eliminate the diethylene glycol not reacted.

The physicochemical characteristics of portions A and B are found to be as follows:

| | A | B |
|---|---|---|
| Acidity index (mg KOH/g) | $\leq 1.7$ | $\leq 1.7$ |
| Hydroxyl index (mg KOH/g) | 58–62 | 52–56 |
| Viscosity at 25° C. (mPas) | 18000–22000 | 21000–25000 |
| Water content (% K-F) | <0.1 | <0.1 |
| Cyclic ester( % by weight) | $\geq 1.0$ | $\leq 0.25$ |

Example 2

Two polyurethane foams, A and B, containing 30 kg/m$^3$ are prepared, in the same way and by a conventional method, using the polyesters A and B obtained in the previous example and the following reagents:

| | |
|---|---|
| Polyester | 93.5 parts by weight |
| N-ethyl morpholine | 1.0 parts by weight |
| Dimethyl benzylamine | 0.5 parts by weight |
| Silicon 8300B (Goldschmidt) | 1.0 parts by weight |
| Water | 4.2 parts by weight |
| Toluene diisocyanate 80/20 | 51.8 parts by weight |

Foam A, prepared using polyester A, has a cyclic ester content which is greater than 0.6% by weight and foam B, prepared using polyester B, has a cyclic ester content which is less than 0.17% by weight.

Example 3

Foams A and B prepared in example 2 are subjected to the gravimetric test according to Standard DIN 75201 B using an apparatus for determining the fogging effect supplied by the company Haake, under the following conditions: circular samples with a diameter of 8 cm and a thickness of 10 mm, temperature 100° C., time 16 hours.

Foam sample A gives a fogging result which is greater than 7 mg. However, foam sample B gives a fogging result which is less than 1 mg.

Example 4

A sufficient quantity of cyclic adipate of diethylene glycol is added to part of the polyester B obtained in example 1 to reach a content of 1% by weight. A polyurethane foam is made using this polyester by the procedure followed in example 2 and the resulting foam is then subjected to the test according to Standard DIN 75201 B under the conditions described in example 3.

The foam obtained gives a fogging value greater than 6 mg.

While the invention has been illustrated and described as being embodied in flexible polyurethane foams with reduced fogging effect and polyesters suitable for their preparation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Polyester polyol containing less than 0.4% by weight of 8,13-dioxo-1,4,7-trioxacyclotridecane and made by reacting adipic acid with at least one polyalcohol, wherein said at least one polyalcohol includes diethylene glycol.

2. Interior lining contained within a motor vehicle, said interior lining comprising a flexible polyurethane foam made by reacting said polyester polyol of claim 1 with at least one polyisocyanate and said polyurethane foam containing less than 0.25% of said 8,13-dioxo-1,4,7-trioxacyclotridecane so as to result in a fogging effect of less than 1 mg in a gravimetric test performed by heating a sample of said polyurethane foam at 100° C. for 16 hours according to Standard DIN 75201 B.

3. Flexible polyurethane foam made by reacting said polyester polyol of claim 1 with at least one polyisocyanate and containing less than 0.17% by weight of said 8,13-dioxo-1,4,7-trioxacyclotridecane so as to result in a fogging effect of less than 1 mg in a gravimetric test performed by heating at 100° C. for 16 hours according to Standard DIN 75201 B.

4. Flexible polyurethane foam as defined in claim 3, wherein said at least one polyisocyanate comprises toluene diisocyanate.

* * * * *